United States Patent
Suh et al.

(10) Patent No.: US 8,036,175 B2
(45) Date of Patent: Oct. 11, 2011

(54) HANDOFF METHOD BETWEEN HETEROGENEOUS NETWORKS AND SYSTEM THEREOF

(75) Inventors: Kyung-Joo Suh, Seoul (KR); Beom-Sik Bae, Suwon-si (KR); Dae-Gyun Kim, Seongnam-si (KR); Jung-Soo Jung, Seongnam-si (KR); Veronica Kondratieva, Suwon-si (KR); Yong Chang, Seongnam-si (KR); Nae-Hyun Lim, Yongin-si (KR); Jung-Shin Park, Seoul (KR); Dae-Woo Lee, Seoul (KR); Jun-Hwan Oh, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 940 days.

(21) Appl. No.: 11/970,315

(22) Filed: Jan. 7, 2008

(65) Prior Publication Data

US 2008/0170548 A1 Jul. 17, 2008

(30) Foreign Application Priority Data

Jan. 5, 2007 (KR) ........................ 10-2007-0001793

(51) Int. Cl.
*H04W 4/00* (2009.01)
(52) U.S. Cl. .................. 370/331; 370/332; 455/355
(58) Field of Classification Search .................. None
See application file for complete search history.

(56) References Cited

U.S. PATENT DOCUMENTS

| | | | |
|---|---|---|---|
| 2005/0068929 A1 | 3/2005 | Chang et al. | |
| 2007/0208864 A1* | 9/2007 | Flynn et al. | 709/227 |
| 2008/0125126 A1* | 5/2008 | Fang et al. | 455/436 |

FOREIGN PATENT DOCUMENTS

| | | |
|---|---|---|
| JP | 2003-235064 | 8/2003 |
| JP | 2005-130487 | 5/2005 |
| KR | 1019980045025 | 9/1998 |

OTHER PUBLICATIONS

Chiba et al., "High-Speed Hand-Off Method by Preservation and Transmission of PPP Session Information", Proceedings of the 2004 IEICE Communications Society Conference, Sep. 21-24, 2004.

* cited by examiner

*Primary Examiner* — Chi Pham
*Assistant Examiner* — Kouroush Mohebbi
(74) *Attorney, Agent, or Firm* — The Farrell Law Firm, P.C.

(57) ABSTRACT

A handoff method between a source network to which a terminal is connected in order of a Base Station (BS) and an Access Service Network (ASN), and a target network to which the terminal is connected in order of a Packet Data Service Node (PDSN), a Packet Control Function (PCF) and an Access Network (AN). The terminal sends a handoff request message with AN information of the target network to the ASN via the BS. The ASN forwards the handoff request message to the PCF via the PDSN using the AN information. Upon receipt of the handoff request message, the PCF sends a request for session information to the ASN via the PDSN. The PDSN sends a request for context information to the ASN. Upon receipt of the session information request and the context information request, the ASN transfers the context information to the PDSN and transfers the session information to the AN via the PDSN and the PCF.

20 Claims, 16 Drawing Sheets

HANDOFF METHOD BETWEEN HETEROGENEOUS NETWORKS AND SYSTEM THEREOF

PRIORITY

This application claims priority under 35 U.S.C. §119(a) to a Korean Patent Application filed in the Korean Intellectual Property Office on Jan. 5, 2007 and assigned Ser. No. 2007-1793, the disclosure of which is incorporated herein by reference.

BACKGROUND OF THE INVENTION

1. Field of the Invention

The present invention relates generally to a method for performing handoff in a wireless communication system and a system thereof, and more particularly, to a method capable of performing handoff between heterogeneous networks and a system thereof.

2. Description of the Related Art

Generally, wireless communication systems have been developed for situations when it is not possible to connect a fixed wired network up to a terminal. With progress in communication technology, wireless communication systems have developed into mobile communication systems. The $4^{th}$ generation mobile communication system supports ultra-high-speed multimedia service beyond the $1^{st}$ generation analog system, the $2^{nd}$ generation digital system, and the $3^{rd}$ generation IMT-2000 system supporting the high-speed multimedia service. The IMT-2000 system is roughly classified into the asynchronous system and the synchronous system. Typical asynchronous systems include the Universal Mobile Telecommunication Systems (UMTS) and Wideband Code Division Multiple Access (W-CDMA) systems proposed by $3^{rd}$ Generation Partnership Project (3GPP), and typical synchronous systems include the CDMA 2000 1x, CDMA 2000 1x Evolution Data Only (EV-DO), and CDMA 2000 1x Evolution of Data and Voice (EV-DV) systems proposed by $3^{rd}$ Generation Partnership Project 2 (3GPP2).

A typical example of the $4^{th}$ generation mobile communication system can include the Worldwide Interoperability for Microwave Access (WiMax) system proposed by Institute of Electrical and Electronics Engineers (IEEE). The WiMax system is defined as the IEEE 802.16e standard for providing Wireless Broadband Internet (WiBro) service to mobile terminals, and is now in the preparation phase for commercialization. The WiMax system allows the mobile terminal to wirelessly provide various multimedia services such as Internet access service, high-speed data service, image service, etc. as well as the voice service regardless of the time and place, whether it is on the move or at a standstill. Therefore, the WiMax system attracts public attention as the mobile communication technology capable of meeting the highly-increasing user demand for the wireless Internet service.

In this way, several different types of communication networks coexist in the current mobile communication system. In addition, due to the development of the mobile communication technology and the increase in the number of available wireless services, users carrying mobile terminals are increasing in number, causing an increase in the interest in the mobile terminal-based services. Thus, a handoff method between heterogeneous networks is necessary for providing better communication services. The term 'handoff' as used herein refers to a technology allowing a user to seamlessly maintain the communication service while moving from the coverage of one base station (or access network) to the coverage of another base station.

A handoff method between homogeneous networks is now available in the WiMax system. However, not many handoff methods between heterogeneous networks have been proposed in detail. In particular, there is no detailed scheme proposed for the handoff method between the WiMax system and the EV-DO system. Therefore, there is a demand for an efficient scheme for the handoff method between the WiMax system and the EV-DO system, among the handoff methods between heterogeneous networks.

FIG. 1 is a diagram illustrating the architecture of a general 1xEV-DO network (DO network). The DO network includes a Packet Data Service Node (PDSN) 101, connected to the Internet 100, for transmitting high-speed packet data to Access Networks (ANs) 103, and Packet Control Functions (PCFs) 102 for controlling the ANs 103. Each of the ANs 103 wirelessly communicates with a plurality of terminals (commonly known as Access Terminals (ATs)) 104, and transmits the high-speed packet data to the terminal having the highest data rate.

FIG. 2 is a diagram illustrating the architecture of a general WiMax network. The WiMax network includes Base Stations (BSs) 202, each of which wirelessly communicates with a plurality of terminals (commonly known as Mobile Stations (MSs)) 203 and provides the ultrahigh-speed multimedia service, and an Access Service Network (ASN) 201, connected to the Internet 200, for transmitting high-speed packet data to the BSs 202.

Due to the development of the mobile communication industry and the increase in the user demand for Internet services, there is an increasing demand for the mobile communication system capable of efficiently providing Internet services. The conventional mobile communication network, as it was developed to mainly provide the voice services, has the narrower data transmission bandwidth and the higher service charge. IEEE 802.16 Standard Group, one of International Standard Groups, proposes the IEEE 802.16e standard as a standard for providing the WiBro service for mobile terminals.

The typical example of the IEEE 802.16e-based wireless communication system can include a WiMax (also known as WiBro) system. As for the handoff method in the WiMax system, there are handoff technologies proposed for the conventional CDMA 2000 1x system and EV-DO network, but there is no efficient handoff method between heterogeneous networks, designed taking into account the characteristics of the heterogeneous networks. Due to the development of the mobile communication technology and the increase in the number of available wireless services, users carrying mobile terminals are increasing in number, causing an exponential increase in the interest in the mobile terminal-based services. In order to manage locations of the mobile terminals and allow the mobile terminals to provide seamless communication services even during handoff, each mobile communication system proposes a handoff technology suitable for the corresponding mobile communication system. However, many efforts to provide the handoff technology have been chiefly made to efficiently support intra-network handoff, for example, handoff within the 3GPP2 network or the WiMax network.

When the characteristics of the current communication system where heterogeneous networks coexist are taken into consideration, a handoff method between heterogeneous networks is indispensable. For the evolved next generation network, rev C is now prepared in the 3GPP2 EV-DO network, and one of the matters to be dealt with in rev C is the handoff technology between 3GPP2 rev C and rev A. Further, there is no detailed scheme proposed for the handoff method between the EV-DO network and the WiMax network, commercialization of which is now in preparation after completion of its standardization. Therefore, there is a demand for an efficient scheme for a handoff method between the WiMax system and the EV-DO network, among the handoff methods between heterogeneous networks.

SUMMARY OF THE INVENTION

The present invention has been made to address at least the above problems and/or disadvantages and to provide at least the advantages described below. Accordingly, an aspect of the present invention provides a method and system capable of seamlessly performing handoff of a service between a WiMax system and an EV-DO network.

Another aspect of the present invention provides a method and system capable of performing handoff between a WiMax system and an EV-DO network, taking into account characteristics of the EV-DO system.

An additional aspect of the present invention provides a method and system capable of performing handoff between a WiMax system and an EV-DO network, taking into account characteristics of the WiMax system.

According to one aspect of the present invention, a handoff method is provided between a source network to which a terminal is connected in order of a Base Station (BS) and an Access Service Network (ASN), and a target network to which the terminal is connected in order of a Packet Data Service Node (PDSN), a Packet Control Function (PCF) and an Access Network (AN). A handoff request message with AN information of the target network is sent by the terminal to the ASN via the BS. The handoff request message is forwarded by the ASN to the PCF via the PDSN using the AN information. Upon receipt of the handoff request message, a request for session information is sent by the PCF to the ASN via the PDSN. A request for context information is sent by the PDSN to the ASN. Upon receipt of the session information request and the context information request, the context information is transferred by the ASN to the PDSN, and the session information is transferred to the AN via the PDSN and the PCF.

According to another aspect of the present invention, a handoff method is provided between a source network to which a terminal is connected in order of a Base Station (BS) and an Access Service Network (ASN), and a target network to which the terminal is connected in order of a Packet Data Service Node (PDSN), a Packet Control Function (PCF) and an Access Network (AN), the BS being directly connected to the AN. A handoff request is sent by the terminal to the ASN via the BS, and a handoff interim indication message is sent to the BS upon receipt of a handoff response in response to the handoff request. Upon receipt of the handoff interim indication message, session information is transferred by the BS to the AN. Upon receipt of the session information, a bearer to the PDSN is set up by the AN via the PCF using the session information. Context information is received from the ASN, when the PDSN to which the bearer is set up sends a handoff request to the ASN.

According to a further aspect of the present invention, a handoff system is provided between a source network to which a terminal is connected in order of a Base Station (BS) and an Access Service Network (ASN), and a target network to which the terminal is connected in order of a Packet Data Service Node (PDSN), a Packet Control Function (PCF) and an Access Network (AN). The handoff system includes the terminal for sending a handoff request message with AN information of the target network to the ASN via the BS, and negotiating with the ASN on a session for access to the target network. The handoff system also includes the BS for forwarding the handoff request message to the PCF via the PDSN using the AN information, and the PCF for, upon receipt of the handoff request message, sending a request for session information to the ASN via the PDSN. Additionally, the handoff system includes the PDSN for sending a request for context information to the ASN. Further, the handoff system includes the ASN for, upon receipt of the session information request and the context information request, transferring the context information to the PDSN and transferring the session information to the AN via the PDSN and the PCF.

According to yet another aspect of the present invention, a handoff system is provided between a source network to which a terminal is connected in order of a Base Station (BS) and an Access Service Network (ASN), and a target network to which the terminal is connected in order of a Packet Data Service Node (PDSN), a Packet Control Function (PCF) and an Access Network (AN), the BS being directly connected to the AN. The handoff system includes the terminal for sending a handoff request to the ASN via the BS, and sending a handoff interim indication message to the BS upon receipt of a handoff response in response to the handoff request. The handoff system also includes the BS for transferring session information to the AN upon receiving the handoff interim indication message, and the AN for receiving the session information, and setting up a bearer to the PDSN via the PCF using the session information. Additionally, the handoff system includes the PDSN for sending a handoff request to the ASN and receiving a handoff response with context information from the ASN, if the terminal sends a handoff indication after the bearer is set up.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Figure 1:
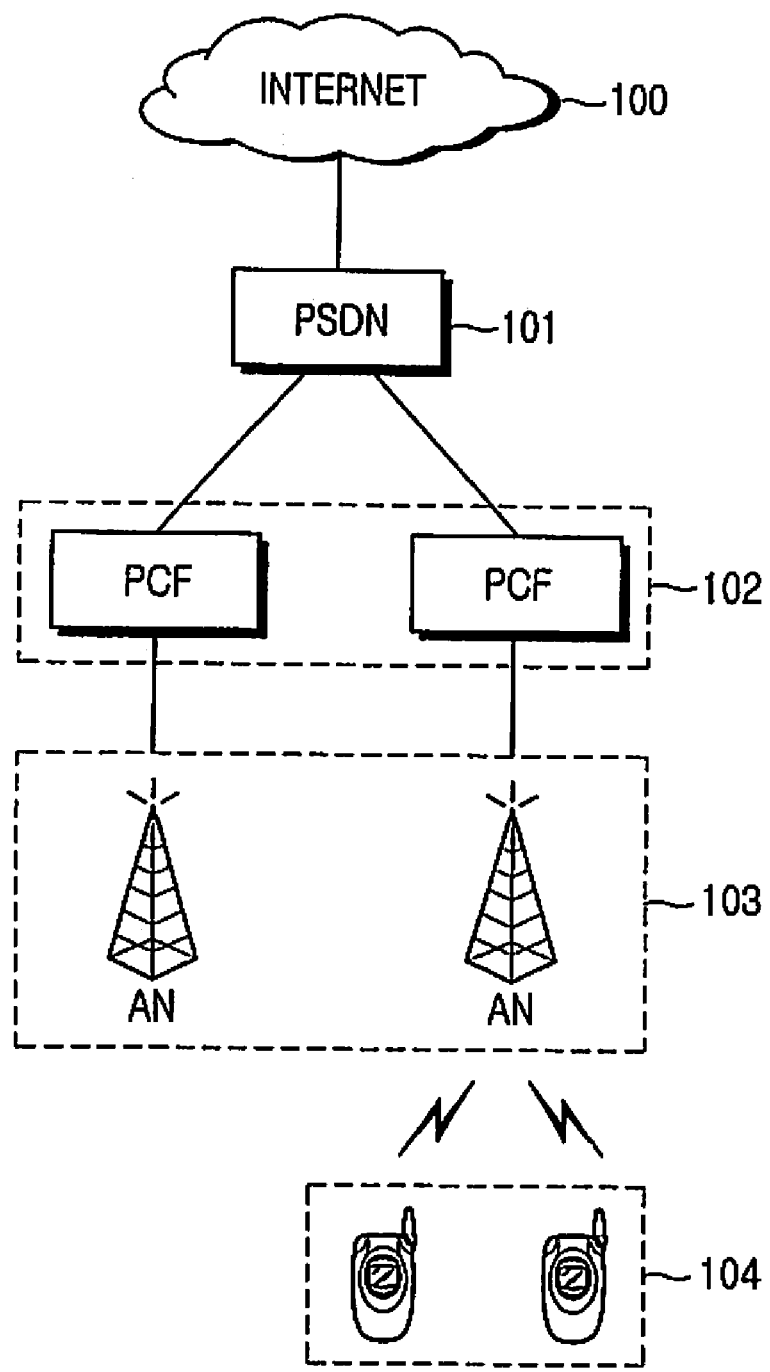
FIG. 1 is a diagram illustrating the architecture of a general 1xEV-DO network.
Figure 2:
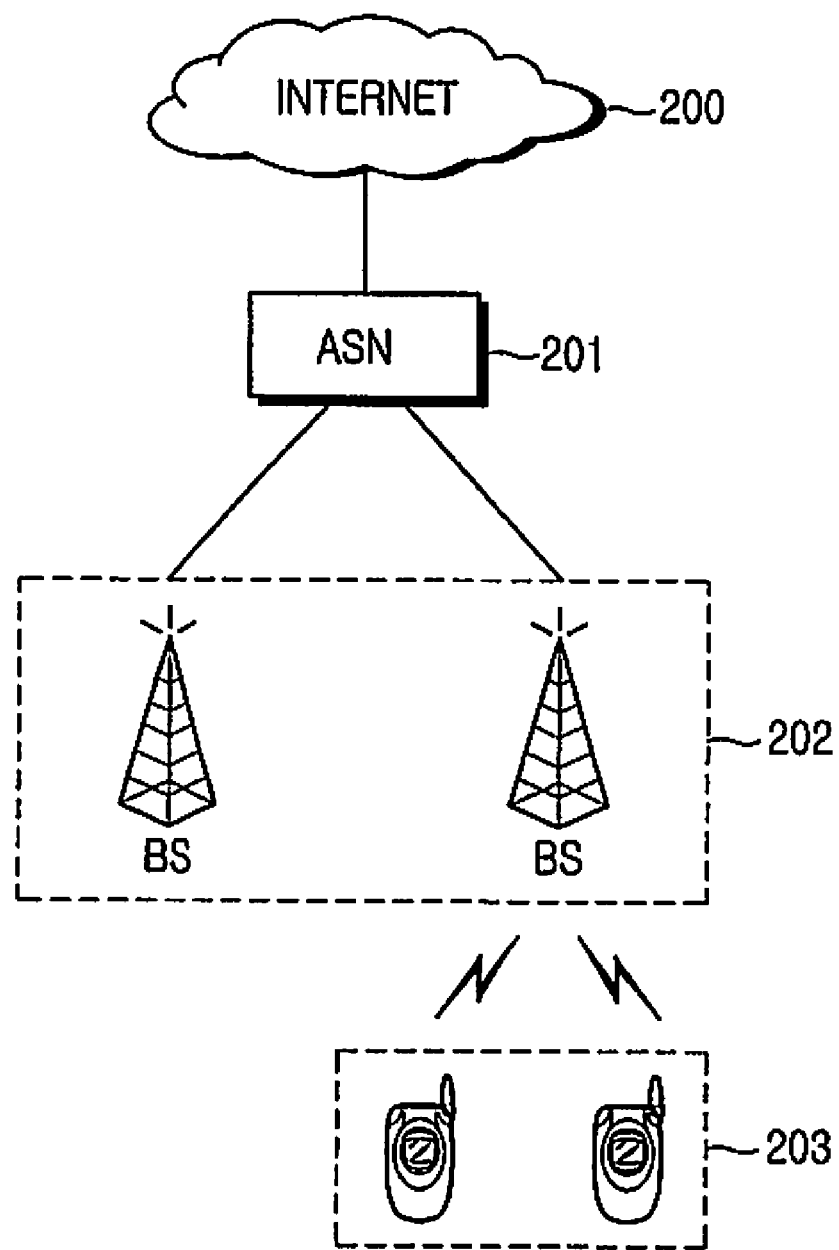
FIG. 2 is a diagram illustrating the architecture of a general WiMax network.

Preferred embodiments of the present invention are described in detail with reference to the accompanying drawings. It should be noted that similar components are designated by similar reference numerals although they are illustrated in different drawings. Detailed descriptions of constructions or processes known in the art may be omitted to avoid obscuring the present invention.

Figure 3:
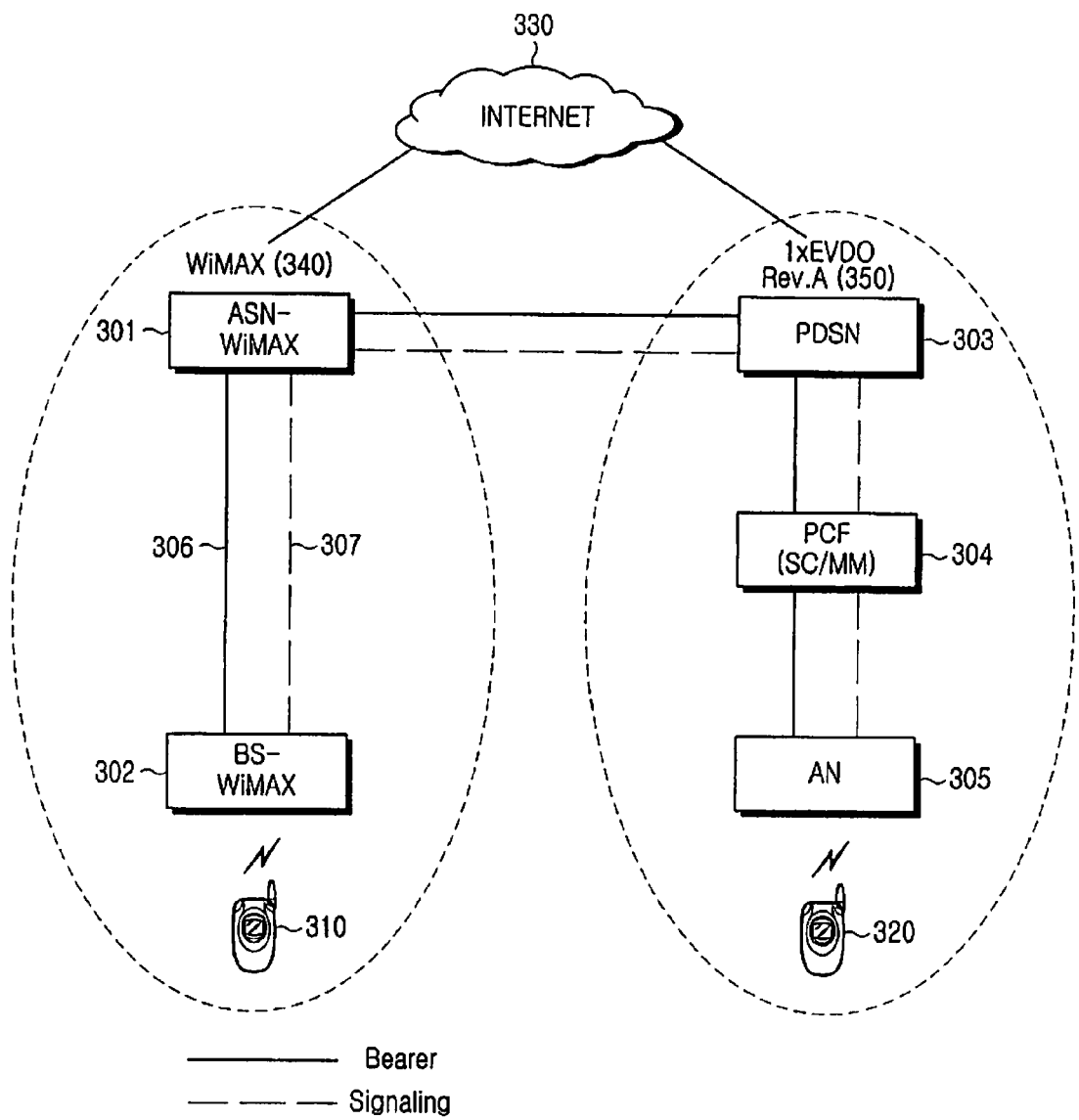
FIG. 3 is a diagram illustrating the network architecture for handoff between a WiMax system and a DO network according to an embodiment of the present invention.

FIG. 3 is a diagram illustrating the network architecture for handoff between a WiMax system and a DO network according to an embodiment of the present invention. Reference numerals 301 and 302 denote elements of the WiMax network. Reference numeral 301 denotes an Access Service Network (ASN) of the WiMax network, and the ASN 301 connects the Internet 330 to the WiMax network 340, and exchanges high-speed packet data with a WiMax Base Station (BS) 302. The BS 302 transmits the user data received via the ASN 301 to a terminal 310, and transfers the user data received from the terminal 310 to the ASN 301. Reference numeral 306 denotes a data interface for data exchange between the ASN 301 and the BS 302, and reference numeral 307 denotes an interface for exchange of control signals therebetween.

Reference numeral 303-305 denote elements of the DO network. A Packet Data Service Network (PDSN) 303 connects the Internet 330 to the DO network 350. A Packet Control Function (PCF) 304 maintains the connection between the PDSN 303 and a DO Access Network (AN) 305, and transfers packets through the connection. The AN 305 transfers the user data received via the PDSN 303 and the PCF 304 to a terminal 320, and transfers the data received from the terminal 320 to the PCF 304. In FIG. 3, the PCF 304 can include a Session Control/Mobility Management (SC/MM) unit.

Although, for convenience, one BS 302 and one terminal 310 are provided herein in the WiMax network 340, by way of example, a plurality of BSs can be connected to one ASN 301 and a plurality of terminals can be connected to one BS 302. Similarly, in the DO network, a plurality of ANs can be connected to one PCF 304 and a plurality of terminals can be connected to one AN 305.

Embodiments of the present invention have the following basic concepts. That is, to perform seamless handoff, the present invention previously transmits two types of information to the DO network before handoff, thereby reducing a handoff process time and enabling the seamless handoff. The two types of information transferred to the DO network can include (1) session information and (2) context information, and definitions thereof will be given below.

(1) Session Information

Commonly, the term 'session' refers to the locally connected state in which a terminal is connected to an arbitrary network. In addition, the 'session information', which is the information necessary for the connected state, as used herein refers to a set of the information necessary for an air interface between a terminal and a base station (BS/AN). When handoff is performed, two sessions exist: a session before handoff (hereinafter referred to as 'old session') and a session after handoff. It should be noted herein that the session information indicates the session after handoff. The session information, because it is the information necessary for an air interface with the terminal, is the information necessary in a base station level of the communication network. Therefore, in the DO network, the session information is needed for the AN 305.

(2) Context Information

The term 'context' as used herein refers to a set of the information needed by the terminal to access the communication network and receive a data service therefrom. That is, the 'context information' refers to a set of authentication, security and Quality of Service (QoS) information for the terminal. The context information is the information necessary for the ASN 301 in the WiMax network, and for the PDSN 303 in the DO network.

The first embodiment of the present invention based on the network architecture of FIG. 3 has the following basic concept. When there is a need for handoff as a mobile terminal intends to move from the WiMax network to the DO network, the terminal sends a handoff request to a BS of the WiMax network. The handoff request is transferred up to the AN of the DO network via the elements of both the WiMax network and the DO network. The AN of the DO network sets up a bearer up to the PDSN 303 of the DO network, in response to the handoff request.

After the handoff request, the terminal 310 previously negotiates with the BS of the WiMax network on the session to the DO network, to be set up after handoff. The session information acquired through the negotiation is transferred up to the AN 305 of the DO network. In addition, the context information stored in the ASN 301 of the WiMax network is transferred to the PDSN 303. Thereafter, a handoff process is performed using the above two types of the acquired information. When the set bearer is activated, the terminal can receive the data service from the DO network. A detailed description thereof will be made below with reference to FIGS. 4A and 4B.

Figure 4A:
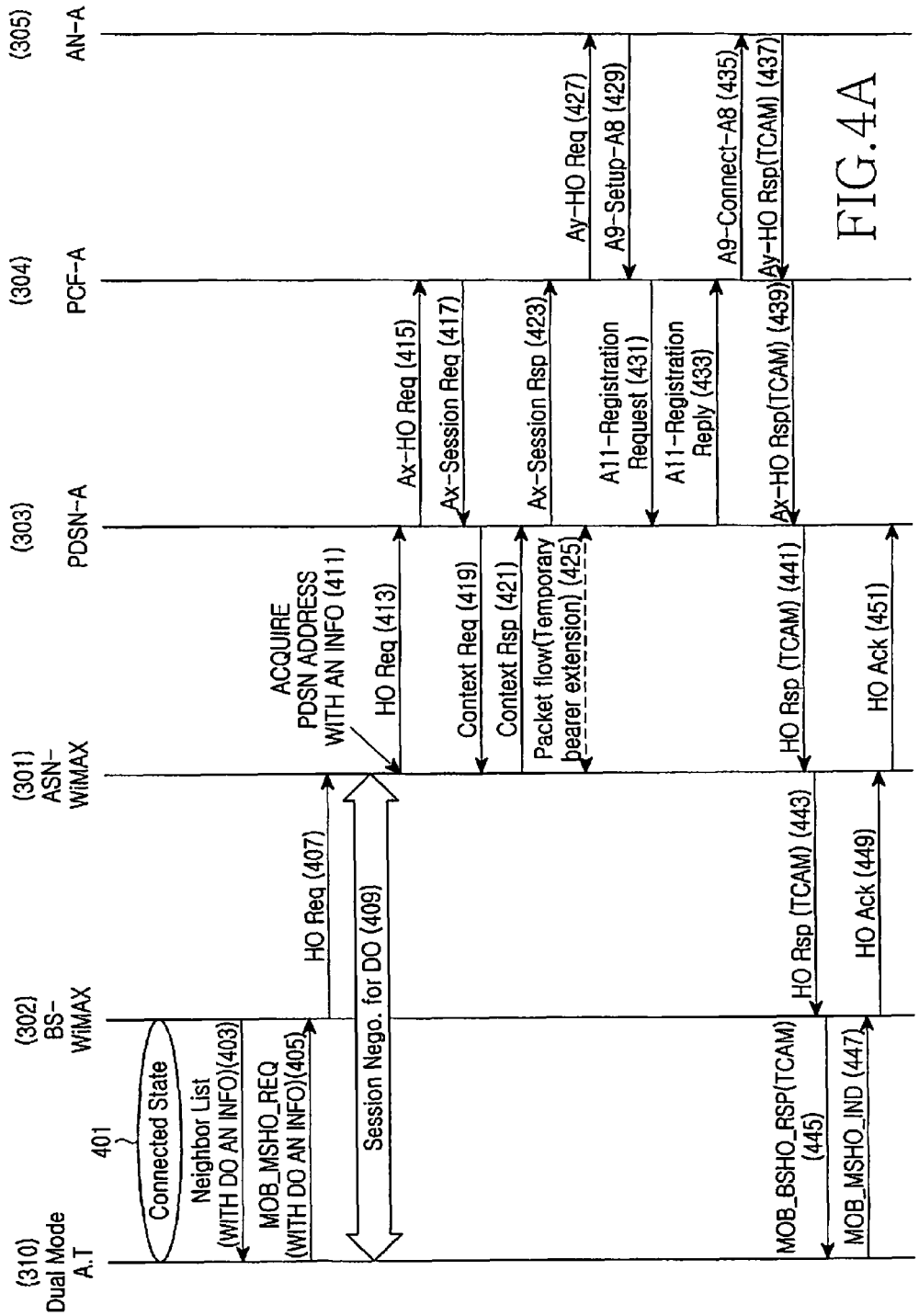
FIGS. 4A and 4B are diagrams illustrating a handoff procedure between a WiMax network and a DO network according to an embodiment of the present invention.
Figure 4B:
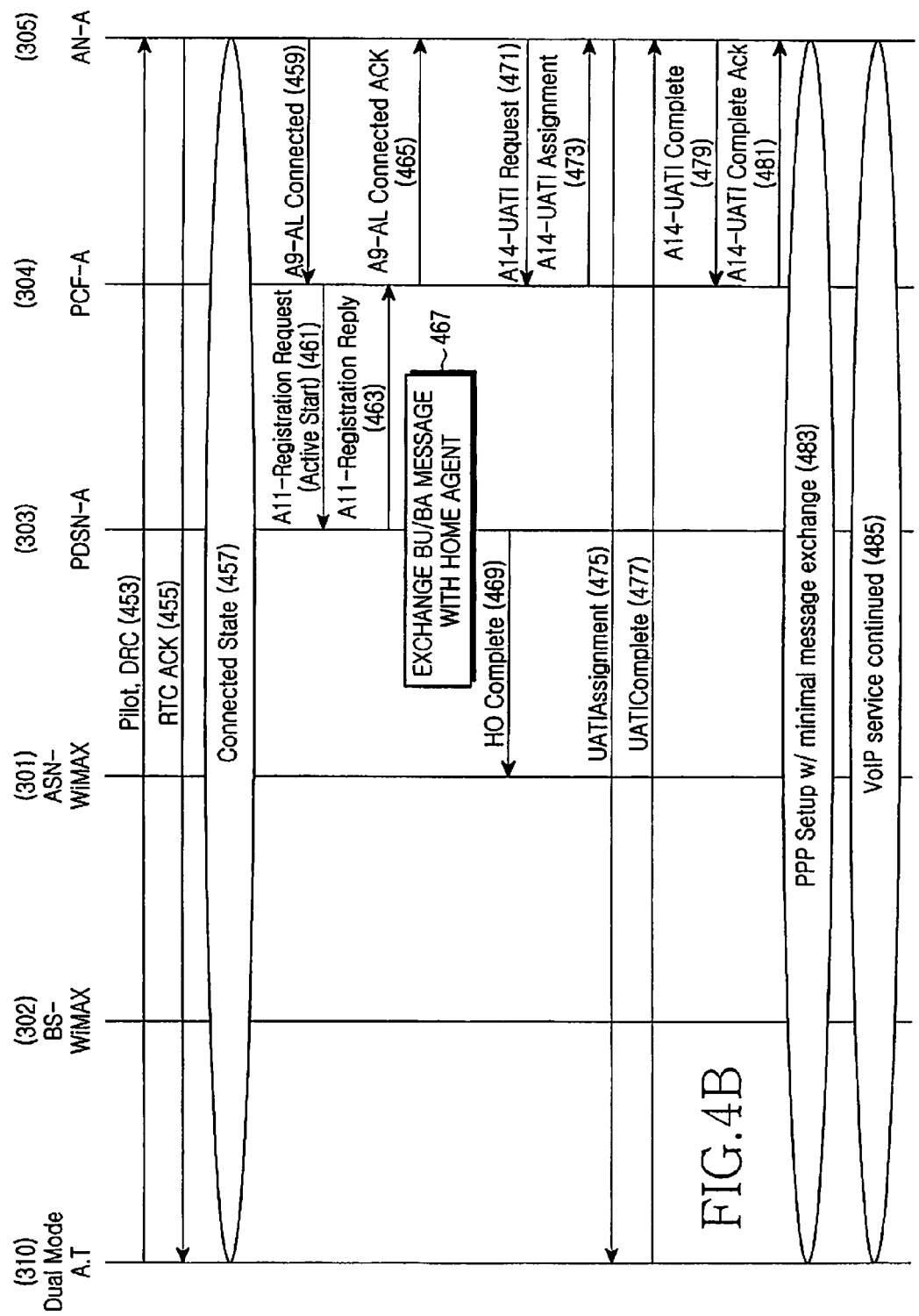

FIGS. 4A and 4B are diagrams illustrating a handoff procedure between a WiMax network and a DO network according to an embodiment of the present invention.

In step 401, a terminal (or dual mode Access Terminal (AT)) 310 is assumed to be connected to a BS 302 (Connected State). In step 403, the terminal 310 receives a neighbor list with information on the AN of the DO network, transmitted from the BS 302. The neighbor list includes lists of the base stations neighboring the WiMax network. Because the neighbor list is the information broadcasted by the BS 302, the terminal 310 can receive the neighbor list without a separate request. That is, the terminal 310 receives list information of the base station(s) neighboring the WiMax network to which it currently belongs, and the base station list information includes information of each base station. The base station information can include Pilot Pseudo Noise (PN), AN's identification (AN-ID), sector ID, etc.

In step 405, the terminal 310 transmits a handoff request (MOB_MSHO-REQ) message with the base station information to the BS 302. For reference, in MOB_MSHO-REQ, 'MOB' means Mobile, 'MS' means Mobile Station, 'HO' means Hand-Off, and 'REQ' means Request.

Thereafter, in step 407, the BS 302 sends a handoff request (HO Req) message to an ASN 301. In step 409, the terminal 310 performs session negotiation with the ASN 301. As described above, although it is general that the terminal 310 performs the session negotiation with the DO base station, i.e., AN 305, because the terminal 310 has kept the session to the WiMax network, and not the DO network, the terminal 310 previously negotiates over the session after handoff, for seamless data transmission/reception. However, the session negotiation can be omitted. In this case, the session to the AN 305 can be set up according to a preset default value.

In step 411, the ASN 301 acquires a PDSN address using the base station information received in step 407. The ASN 301 can use the Pilot PN in the base station information, or can further use AN-ID and sector-ID. Thereafter, the ASN 301 forwards in step 413 the HO Req message to a PDSN 303 associated with the PDSN address. In step 415, the PDSN 303 sends a handoff request (Ax-HO Req) message to a PCF 304.

Upon receiving the handoff request message, the PCF 304 sends a request for session information to the ASN 301 and receives the session information therefrom in steps 417 to 423. That is, the PCF 304 sends a session request (Ax-Session Req) message to the PDSN 303 in step 417. For reference, 'Ax' indicates an interface defined in the present invention. Thereafter, in step 419, the PDSN 303 sends a context request message to the ASN 301 of the WiMax network to acquire context information of the terminal 310 located in the WiMax network. In response thereto, the ASN 301 feeds back a context response message in step 421. The context response is transmitted along with the context information and the session information. In step 423, the PDSN 303 sends a session response (Ax-Session Rsp) message to the PCF 304 along with the session information. That is, the context response transmitted by the ASN 301 includes both the session information and the context information. The context information, because it is the information necessary for the PDSN 303, is transferred up to the PDSN 303, and the session information, because it is the information needed for the AN 305, is transmitted to the PCF 304.

In this way, through steps 417 to 423, the PCF 304 acquires the session information. Thereafter, the PCF 304 sends a handoff request (Ay-HO Req) message to the AN 305 in step 427. For reference, 'Ay' indicates an interface defined in the present invention.

In step 425, a temporary bearer for flow of user data is extended (or set up) between the ASN 301 and the PDSN 303 (Temporary Bearer Extension). The user data, which has existed in the ASN 301 of the WiMax network before handoff, is transmitted to the DO network over the temporary bearer, making seamless data transmission/reception possible before and after the handoff.

Upon receiving the handoff request message of step 427, the AN 305 sets up a bearer to the PDSN 303 through steps 429 to 435. That is, in step 429, the AN 305 sends a setup (A9—Setup—A8) message to the PCF 304 to make a request for bearer setup. In step 431, the PCF 304 sends a registration request (A11—Registration Request) message to the PDSN 303 to make a request for bearer registration. In response to the registration request, the PDSN 303 feeds back a registration reply (A11—Registration Reply) message to the PCF 304 in step 433 to notify the registration of the bearer. Thereafter, in step 435, the PCF 304 sends a bearer connect (A9—Connect—A8) message to the AN 305 to notify the connection of the bearer. Here, the A9—Connect—A8 message includes the session information transmitted to the PCF 304 in step 423. The reason why the A9—Connect—A8 message is transmitted to the AN 305 along with the session information is to allow the AN 305 to assign a traffic channel to the terminal 310 using the session information and to set up an air interface.

Thereafter, in steps 437 to 445, the AN 305 assigns a traffic channel to the terminal 310. That is, in step 437, the AN 305 sends a handoff response (Ay-HO Response) message with a Traffic Channel Assigned Message (TCAM) using the session information. The handoff response message is forwarded from the AN 305 along the path of PCF 304→PDSN 303→ASN 301→BS 302→terminal 310. In this way, the traffic channel is assigned to the terminal 310. Thereafter, the terminal 310 sends a handoff indication (MOB-MSHO-IND) message to the BS 302 in step 447. In steps 449 and 451, a HO ACK is forwarded to the PDSN 303 in order of BS 302→ASN 301→PDSN 303, to notify the PDSN 303 of the normal receipt of the handoff response message.

Thereafter, through steps 453 to 457 of FIG. 4B, a connection is made between the terminal 310 and the AN 305. That is, the terminal 310 sends in step 453 a pilot and a Data Rate Control (DRC) value to the AN 305 to notify the available data rate of the terminal 310, and the AN 305 feeds back in step 455 an ACK using a reverse traffic channel. In this way, the AN 305 and the terminal 310 enter the connected state in step 457.

Thereafter, in steps 459 to 465, the previously set bearer is activated. That is, if the AN 305 sends in step 459 an air link connected (A9—AL Connected) message to the PCF 304, the PCF 304 sends in step 461 a registration request (A11—Registration Request (Active Start)) message to the PDSN 303 to register a start of the bearer activation. In response to the request message, the PDSN 303 feeds back in step 463 a registration reply (A11—Registration Reply) message to the PCF 304, and the PCF 304 sends in step 465 an air link connected ACK (A9—AL Connected ACK) to the AN 305.

In step 467, the PDSN 303 exchanges Binding Update (BU) and Binding Acknowledgment (BA) messages with a Home Agent (not shown) to update the binding cache. For reference, the Home Agent performs a switching operation to connect the data received from the core network to the ASN 301 of the WiMax network or the PDSN 303 of the DO network. That is, the PDSN 303 exchanges the BU and BA messages to allow the data received from the core network after the handoff to be transferred to the DO network. The 'binding cache' as used herein refers to a cache that manages an IP address of the terminal.

Thereafter, in step 469, the PDSN 303 sends a handoff complete (HO Complete) message to the ASN 301.

Steps 471 to 477 indicate a process in which the PCF 304 assigns a Unicast Access Terminal Identifier (UATI) to the terminal 310. That is, if the AN 305 sends a UATI request (A14—UATI Request) message to the PCF 304 in step 471, the PCF 304 feeds back a UATI assignment (A14—UATI Assignment) message to the AN 305 in step 473. For reference, the 'UATI' as used herein refers to an identifier that the PCF 304, when the terminal enters the coverage of the PCF 304, assigns to the terminal 310 to indicate that the corresponding terminal is serviceable in its coverage.

The AN 305 sends in step 475 the UATI assignment (UATI Assignment) message to the terminal 310, and the terminal 310 sends in step 477 a UATI complete (UATI Complete) message to the AN 305 in response thereto. Thereafter, in step 479, the AN 305 forwards the UATI complete (A14—UATI Complete) message to the PCF 304. In response thereto, the PCF 304 sends an ACK (UATI Complete ACK) message in step 481, completing the UATI assignment. Thereafter, in step 483, the terminal 310 sets up a Point-to-Point Protocol (PPP) to the DO network with minimal message exchange to minimize message exchange over the air, thereby facilitating the efficient PPP setup. As a result, Voice over IP (VoIP) or other data services are available in step 485.

Figure 5:
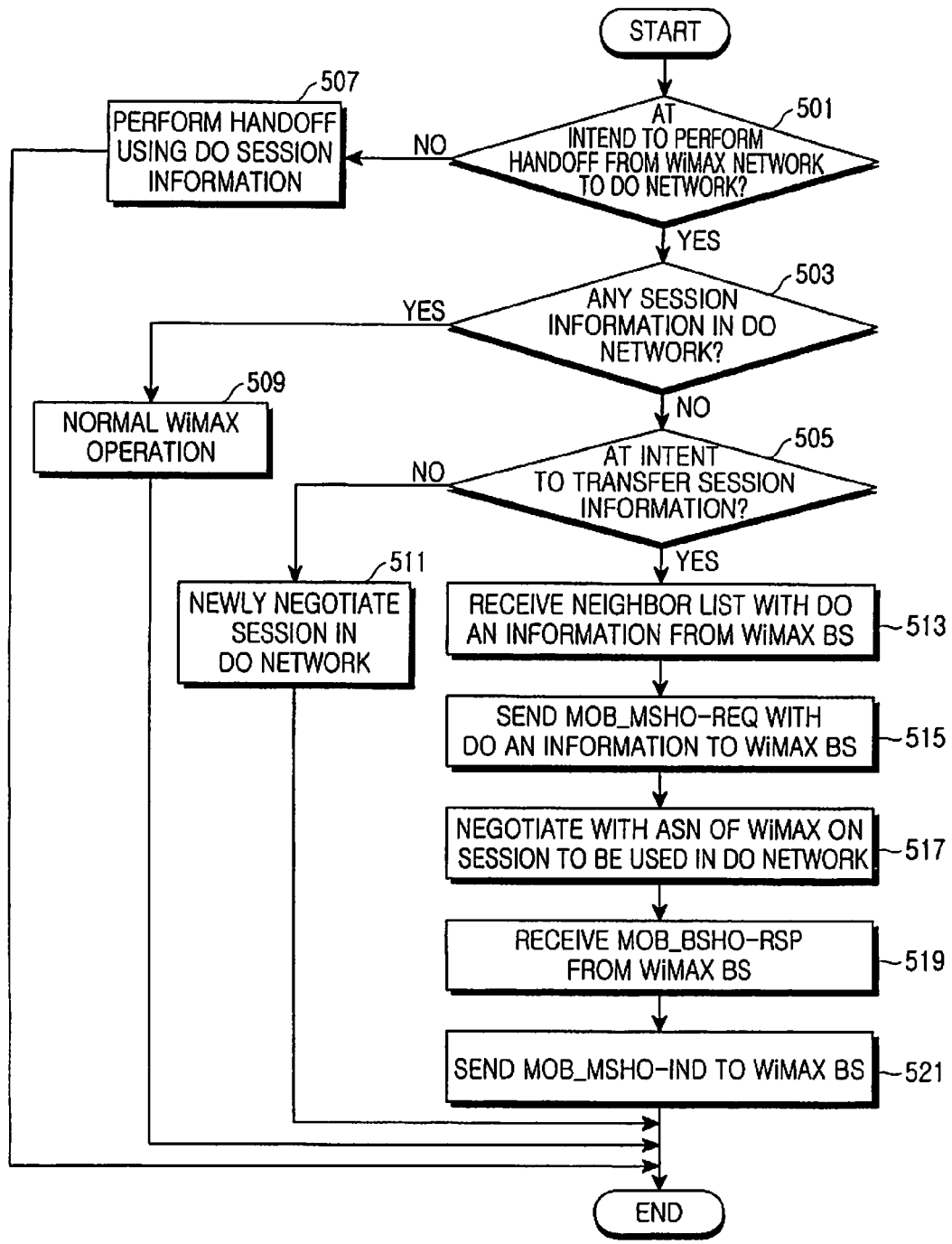
FIG. 5 is a flow diagram illustrating a mobile terminal's operation of performing handoff between a WiMax network and a DO network according to an embodiment of the present invention.

FIG. 5 is a flow diagram illustrating a mobile terminal's operation of performing handoff between a WiMax network and a DO network according to an embodiment of the present invention.

Shown in FIG. 5 is an operation of a dual mode terminal, performed during handoff. The 'dual mode terminal' as used herein refers to a single terminal designed to receive data communication services from both the WiMax network and the DO network.

In step 501, the terminal determines whether to perform handoff from the WiMax network to the DO network. If the terminal determines to perform handoff, the terminal proceeds to step 503. Otherwise, if the terminal determines not to perform handoff, the terminal proceeds to step 507. In step 507, the terminal serves as a WiMax terminal. In step 503, the terminal determines whether the DO network, or target network, has session-related information that the corresponding terminal can use during handoff. If there is the session information in the DO network, the terminal proceeds to step 509 where it performs handoff using the session-related information. However, if there is no session information in the DO network, the terminal determines in step 505 whether it will transmit the session information to the DO network. If the terminal determines not to transmit the session information, the terminal proceeds to step 511 where it negotiates a new session to the DO network. In this case, because a new session should be set up in the DO network, the seamless service, unlike the handoff, cannot be provided.

However, if the terminal determines to transmit the session information to the DO network, the terminal proceeds to step 513 where it receives neighbor list information with a pilot PN of the DO network from a BS. Thereafter, in step 515, the terminal transmits a handoff request (MOB_MSHO-REQ) message with DO base station information to the BS. In step 517, the terminal negotiates with an ASN over the session to be used in the DO network. Upon receiving a handoff response (MOB_BSHO-RSP) message from the WiMax network in step 519, the terminal transmits a handoff indication (MOB-MSHO-IND) message to the BS in step 521.

Figure 6:
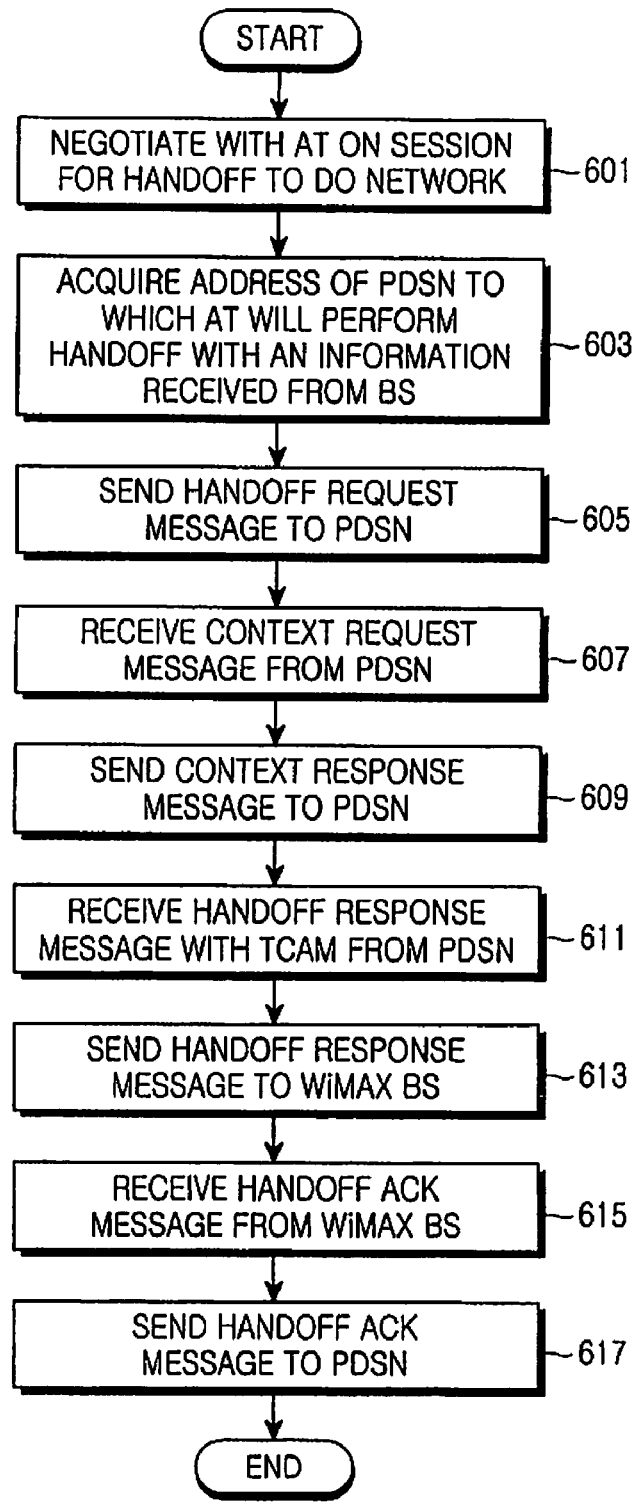
FIG. 6 is a flow diagram illustrating an ASN's operation during handoff between a WiMax network and a DO network according to an embodiment of the present invention.

FIG. 6 is a flow diagram illustrating an ASN's operation during handoff between a WiMax network and a DO network according to an embodiment of the present invention.

Referring to FIG. 6, in step 601, the ASN negotiates with a terminal over a session for handoff of the terminal that moves from the WiMax network to the DO network. In step 603, the ASN acquires an address of a PDSN to which the terminal will perform handoff using the base station information received from a BS. In step 605, the ASN transmits a handoff request message to the PDSN associated with the acquired address. Upon receiving a context request message from the PDSN in step 607, the ASN sends in step 609 a context response message to the PDSN in response to the context request message. As described in FIGS. 4A and 4B, the context response message includes session information and context information. Thereafter, upon receiving a handoff response message with a TCAM from the PDSN in step 611, the ASN forwards the handoff response message to the BS in step 613. Upon receiving an HO ACK message from the BS in step 615, the ASN forwards the HO ACK message to the PDSN in step 617.

Figure 7:
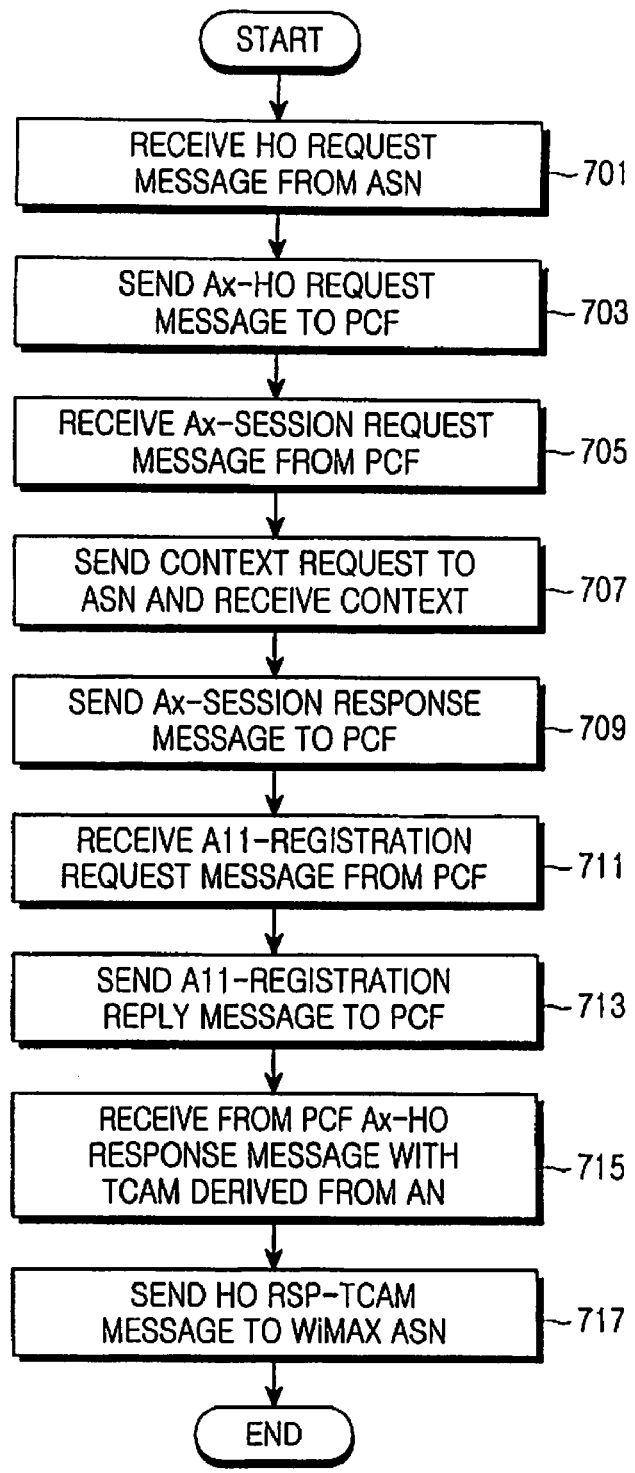
FIG. 7 is a flow diagram illustrating an operation of a PDSN in a DO network during handoff between a WiMax network and the DO network according to an embodiment of the present invention.

FIG. 7 is a flow diagram illustrating an operation of a PDSN in a DO network during handoff between a WiMax network and the DO network according to an embodiment of the present invention.

Upon receiving a handoff request (HO Request) message from an ASN in step 701, the PDSN forwards the handoff request (Ax-HO request) message to a PCF in step 703. As described above, the Ax interface is newly defined in the present invention.

Thereafter, upon receiving a session request (Ax-Session Request) message from the PCF in step 705, the PDSN sends in step 707 a context request to the ASN and receives a context response from the ASN in response to the context request. Thereafter, the PDSN sends in step 709 a session response (Ax-Session Response) message to the PCF, and receives in step 711 registration request (A11—Registration Request) message from the PCF. Thereafter, the PDSN sends in step 713 a registration reply (A11—Registration Reply) message to the PCF, and receives in step 715 a handoff response (Ax-HO Response) message with a TCAM generated by an AN, from the PCF. In step 717, the PDSN sends a handoff response (HO RSP-TCAM) message to the ASN.

Figure 8:
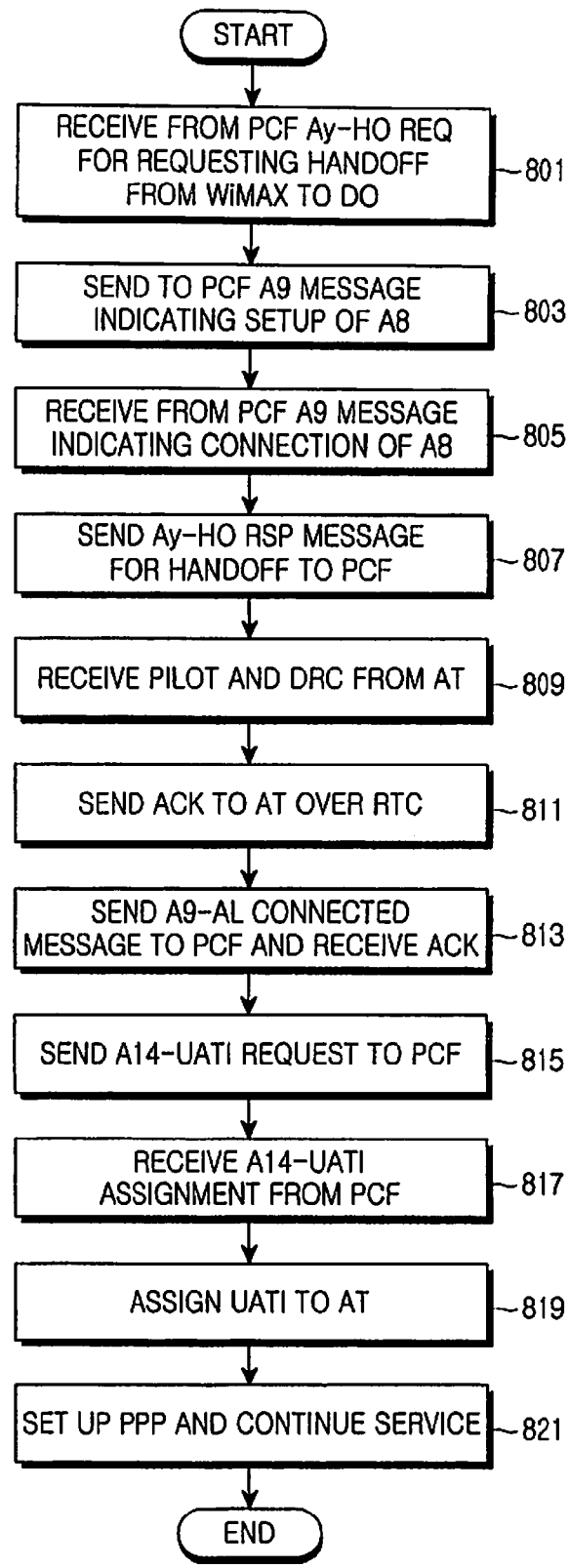
FIG. 8 is a flow diagram illustrating an operation of an AN in a DO network during handoff between a WiMax network and the DO network according to an embodiment of the present invention.

FIG. 8 is a flow diagram illustrating an operation of an AN in a DO network during handoff between a WiMax network and the DO network according to an embodiment of the present invention.

In step 801, the AN receives from a PCF a handoff request (Ay-DO Request) message for requesting handoff from the WiMax network to the DO network. In step 803, the AN sends an A9 message indicating the setup of A8 to the PCF. In step 805, the AN receives from the PCF an A9 message indicating the connection of A8. The A9 message includes session information. In step 807, the AN sends a handoff response (Ay-HO RSP) message to the PCF, where 'Ay' indicates an interface defined in the present invention. In step 809, the AN receives a pilot and a DRC from the terminal to set up the assigned channel. In response, the AN feeds back an ACK to the terminal over a Reverse Traffic Channel (RTC) in step 811. Thereafter, in step 813, the AN sends an A9—AL Connected message to the PCF and receives an ACK from the PCF in response thereto. The AN sends in step 815 a UATI request (A14—UATI Request) message to the PCF, and receives in step 817 a UATI assignment (A14—UATI Assignment) message from the PCF. Thereafter, the AN assigns a UATI to the terminal in step 819, and sets up PPP and continues the service in step 821.

Figure 9:
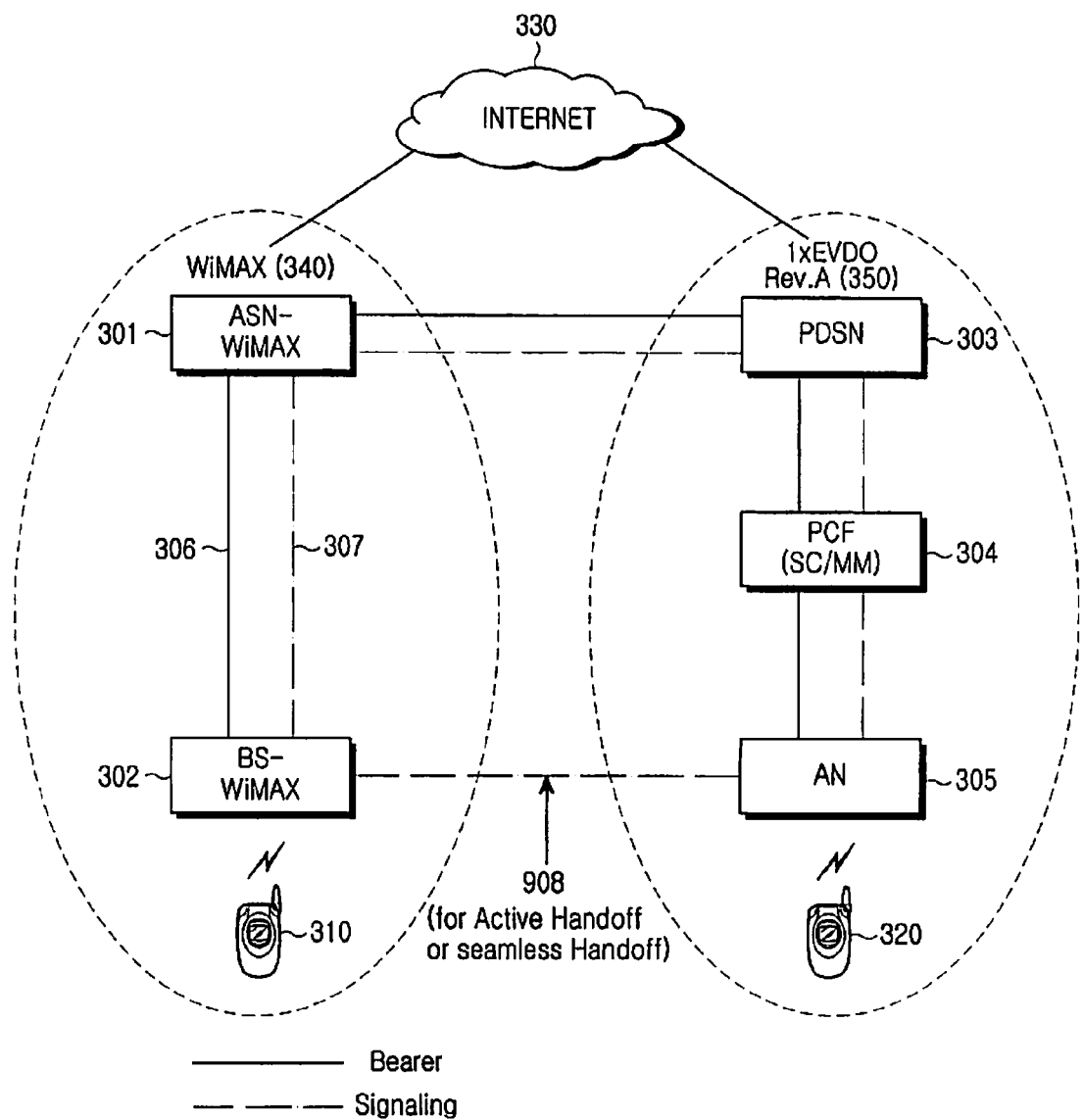
FIG. 9 is a diagram illustrating the network architecture for a description of a handoff method between a WiMax network and a DO network according to embodiments of the present invention.

FIG. 9 is a diagram illustrating the network architecture for a description of a handoff method between a WiMax network and a DO network according to embodiments of the present invention.

The basic network elements are equal in structure to the corresponding ones of FIG. 3. That is, a WiMax network 340 includes a BS 302 and an ASN 301, and a DO network 350 includes an AN 305, a PCF 304 and a PDSN 303. FIG. 9 differs from FIG. 3 in the interface indicated by reference numeral 908. That is, the BS 302 is directly connected to the AN 305 by way of the interface 908. When a terminal 310 located in the WiMax network 340 moves, session information is transferred to the AN 305 in such a manner that a session transfer request message or a R8-related message is transferred from the BS 302 to the AN 305 of the DO network 350 via the interface 908. The message of the conventional DO network is used as the session transfer request message and the message of the conventional WiMax network is used as the R8-related message. Therefore, one embodiment provides a DO network-based handoff scheme, and another embodiment provides a WiMax network-based handoff scheme. Based on these messages, a bearer is set up by signaling in the DO network in order of AN 305→PCF 304→PDSN 303. After the bearer setup, handoff procedure is performed. A detailed description of the embodiments is provided below.

Figure 10A:
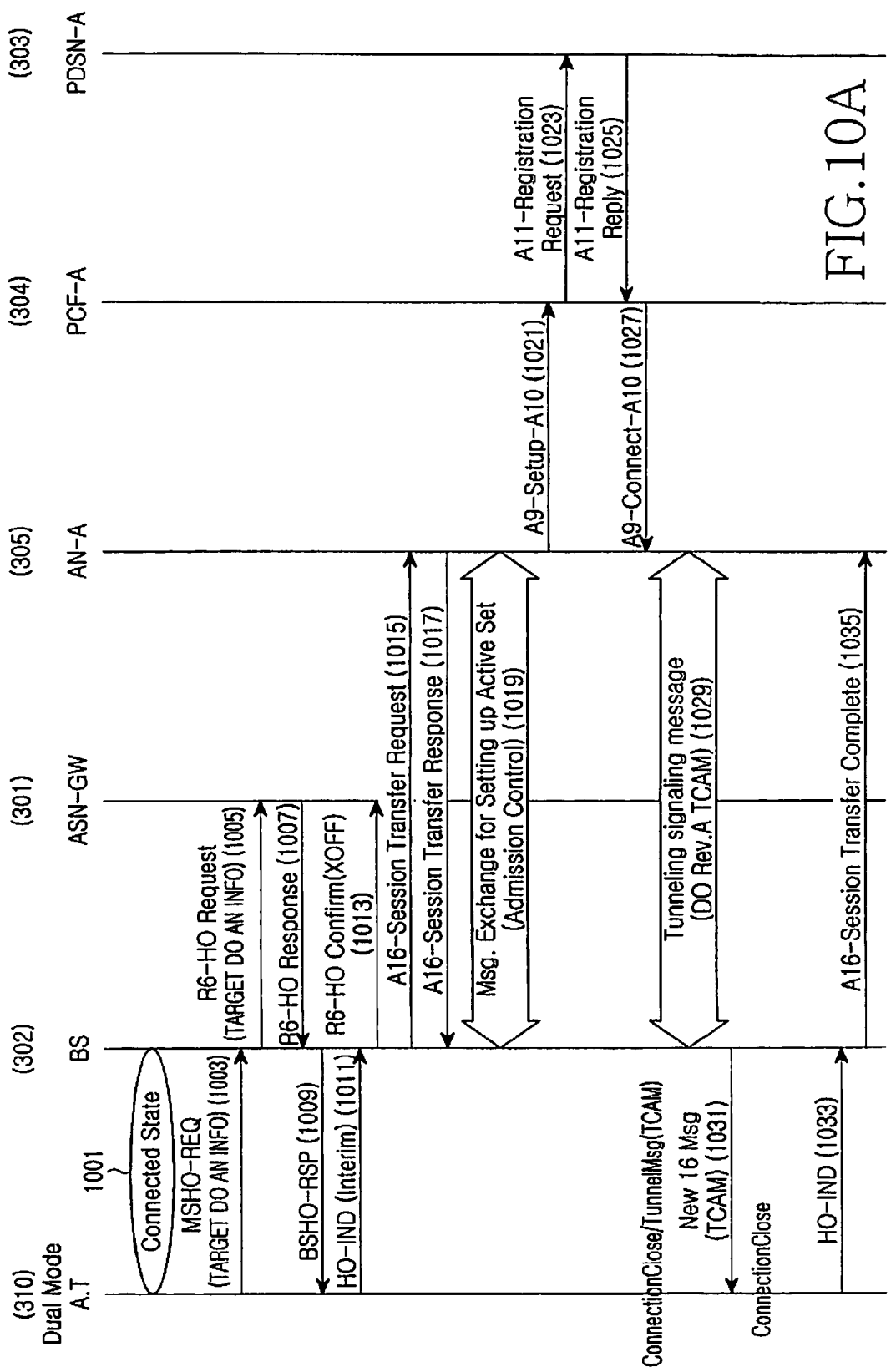
FIGS. 10A to 10C are diagrams illustrating a handoff method based on a DO network interface according to an embodiment of the present invention.
Figure 10B:
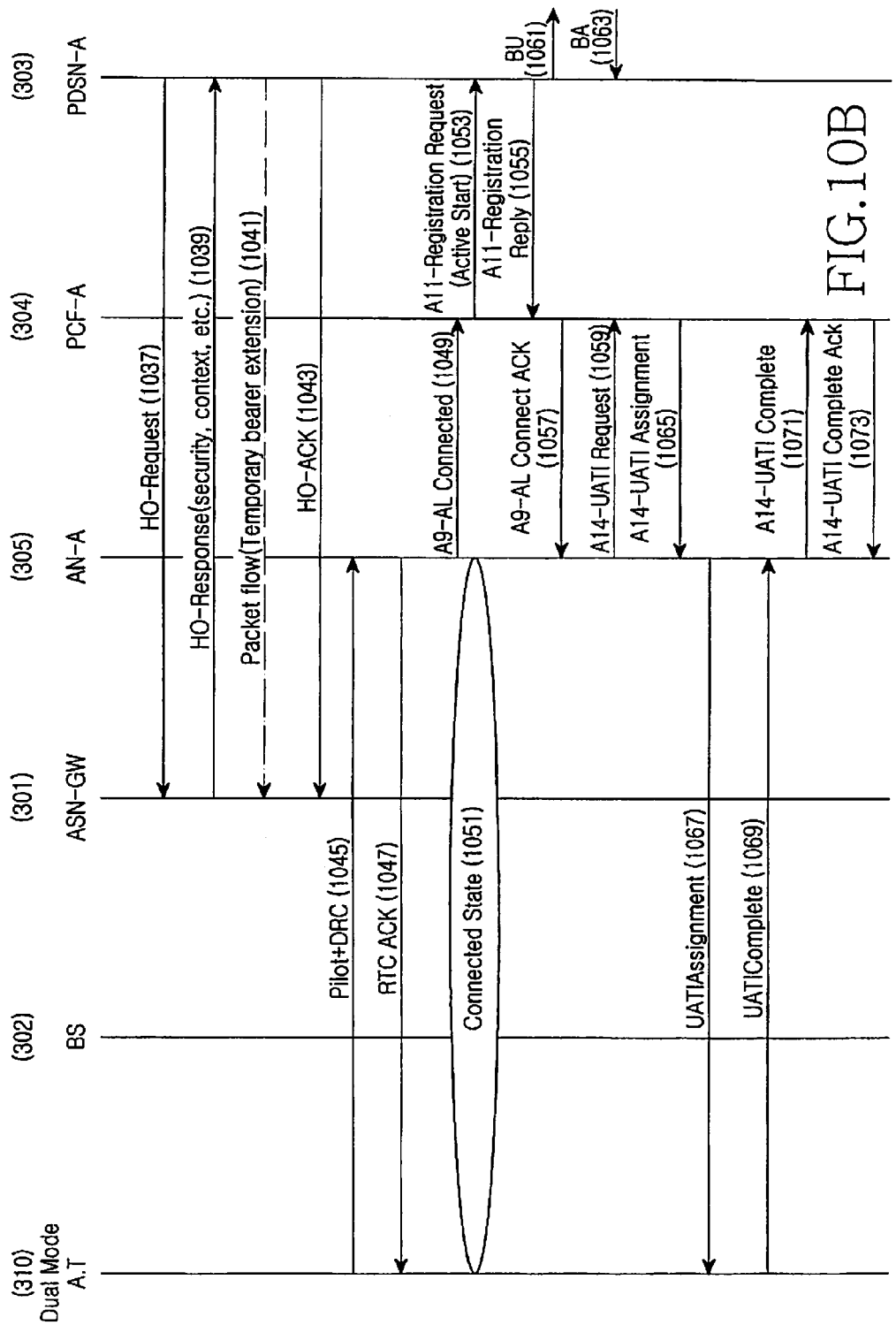
Figure 10C:
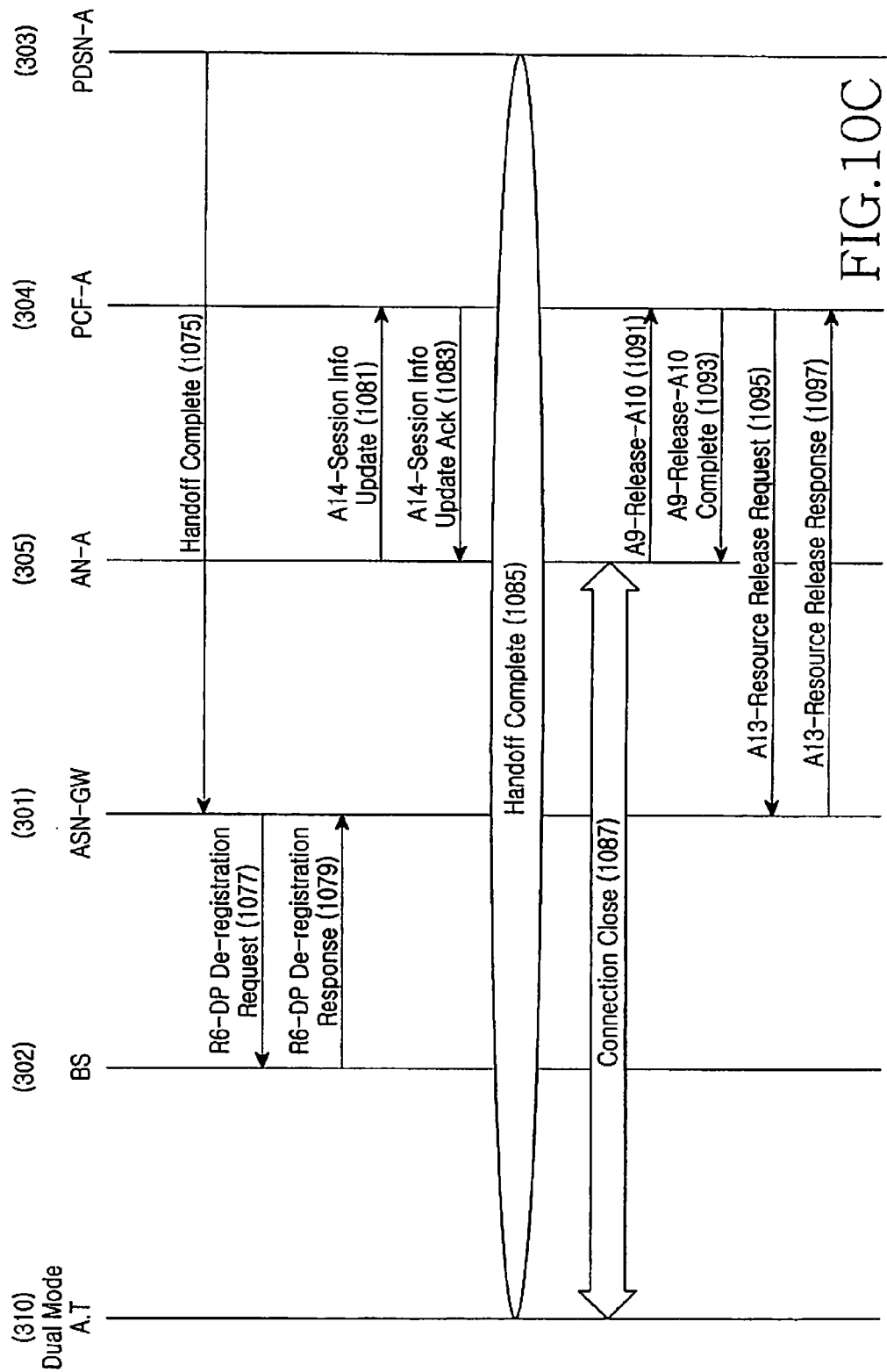

FIGS. 10A to 10C are diagrams illustrating a handoff method based on a DO network interface according to an embodiment of the present invention.

The embodiment of the present invention provides an AN-based handoff scheme in which the WiMax network transfers a session transfer request message to the AN of the DO network during handoff. The second embodiment applies the conventional handoff method used in the same 3GPP2 network to the handoff between heterogeneous networks, proposed by the present invention. The description overlapping with that of FIG. 4 is omitted herein.

In step 1001, the terminal 310 is assumed to be connected to the BS 302 (Connected State). In step 1003, the terminal 310 sends a handoff request (MSHO-REQ) message with base station information to the BS 302. In step 1005, the BS 302 forwards the handoff request (R6-HO Request) message to the ASN 301. In response to the request, the ASN 301 feeds back a handoff response (R6-HO Response) message to the BS 302 in step 1007. Then the BS 302 forwards in step 1009 the handoff response (BSHO-RSP) message to the terminal 310.

In step 1011, the terminal 310 sends a handoff interim indication (HO-IND (Interim)) message to the BS 302. The handoff interim indication (HO-IND (Interim)) message is a message by which the terminal 310 informs the BS 302 of the necessary of handoff. In step 1013, the BS 302 sends a handoff confirm (R6-HO Confirm) message to the ASN 301.

The R6 interface used in steps 1001 to 1013 is the interface used in the conventional WiMax. This process is equal to the scheme available during handoff of the WiMax network. Therefore, the embodiment, though it provides the DO network-based handoff method, uses the R6 interface.

In step 1015, the BS 302 sends a session transfer request (A16—Session Transfer Request) message to the AN 305. The session transfer request message includes session information. The session information is a default value to be used between the terminal 310 and the DO network after the handoff. Alternatively, the session information can be the session information determined before step 1015 through the session negotiation process of FIGS. 4A and 4B. However, the session negotiation process is not shown in the drawings. In step 1017, the BS 302 receives a session transfer response (A16—Session Transfer Response) message in response thereto. In this way, the session information of the terminal 310 can be transferred between the BS 302 and the AN 305. The A16 interface is an interface of the DO network. However, because this interface is used for the WiMax network, the second embodiment provides the DO network-based handoff scheme. Thereafter, in step 1019, the BS 302 and the AN 305 can exchange the channel information that the AN 305 will assign to the terminal 310. Thereafter, in steps 1021 to 1027, a bearer is set up between the AN 305 and the PDSN 303. This process is equal to the process of steps 429 to 435 in FIGS. 4A and 4B.

In steps 1029 to 1031, the AN 305 assigns a traffic channel to the terminal 310 based on the channel information exchanged in step 1019. In step 1033, the terminal 310 sends a handoff indication (HO IND) message to the BS 302. The handoff indication message is different from the handoff interim indication message used in step 1011. As described above, the handoff interim indication message notifies the need for handoff, whereas the handoff indication message actually indicates the handoff. In step 1035, the BS 302 sends a session transfer complete (A16—Session Transfer Complete) message to the AN 305 to notify the completed transfer of the session information transferred in step 1017. The embodiment is different from the embodiment of FIGS. 4a and 4b in that the session information can be directly transferred without passing through the ASN 301, because the direct interface between the BS 302 and the AN 305 of FIG. 9 is used.

Thereafter, in steps 1037 to 1039 of FIG. 10B, the ASN 301 delivers the context information to the PDSN 303. That is, if the PDSN 303 sends a handoff request (HO-Request) message to the ASN 301 in step 1037, the ASN 301 transfers the context information necessary for handoff to the PDSN 303 in step 1039, thereby reducing the handoff time.

In step 1041, a temporary bearer for flow of user data is extended (or set up) between the ASN 301 and the PDSN 303 as done in step 425 of FIG. 4A (Temporary Bearer Extension). The user data, which has existed in the WiMax network before handoff, is transmitted to the DO network over the temporary bearer, making seamless data transmission/reception possible before and after the handoff.

A process of steps 1045 to 1073 is equal to the process of steps 453 to 481 in FIG. 4B. That is, messages for setting up the channel and the air link are exchanged. Thereafter, if the PDSN 303 sends a handoff complete (HO Complete) message to the ASN 301 in step 1075 of FIG. 10C, the connection between the BS 302 and the ASN 301 is deregistered in steps 1077 and 1079. Thereafter, if session information is updated in steps 1081 and 1083, the handoff is completed in step 1085 (HO Complete). Because the handoff is completed by the above process, the connection between the AN 305 and the PCF 304 is closed in steps 1091 and 1093 (Connection Close), and the PCF 304 allows the ASN 301 to release the UATI in steps 1095 and 1097. This is to allow the ASN 301 of the WiMax network to assign the UATI that it assigned to the terminal 310, to another terminal.

Figure 11A:
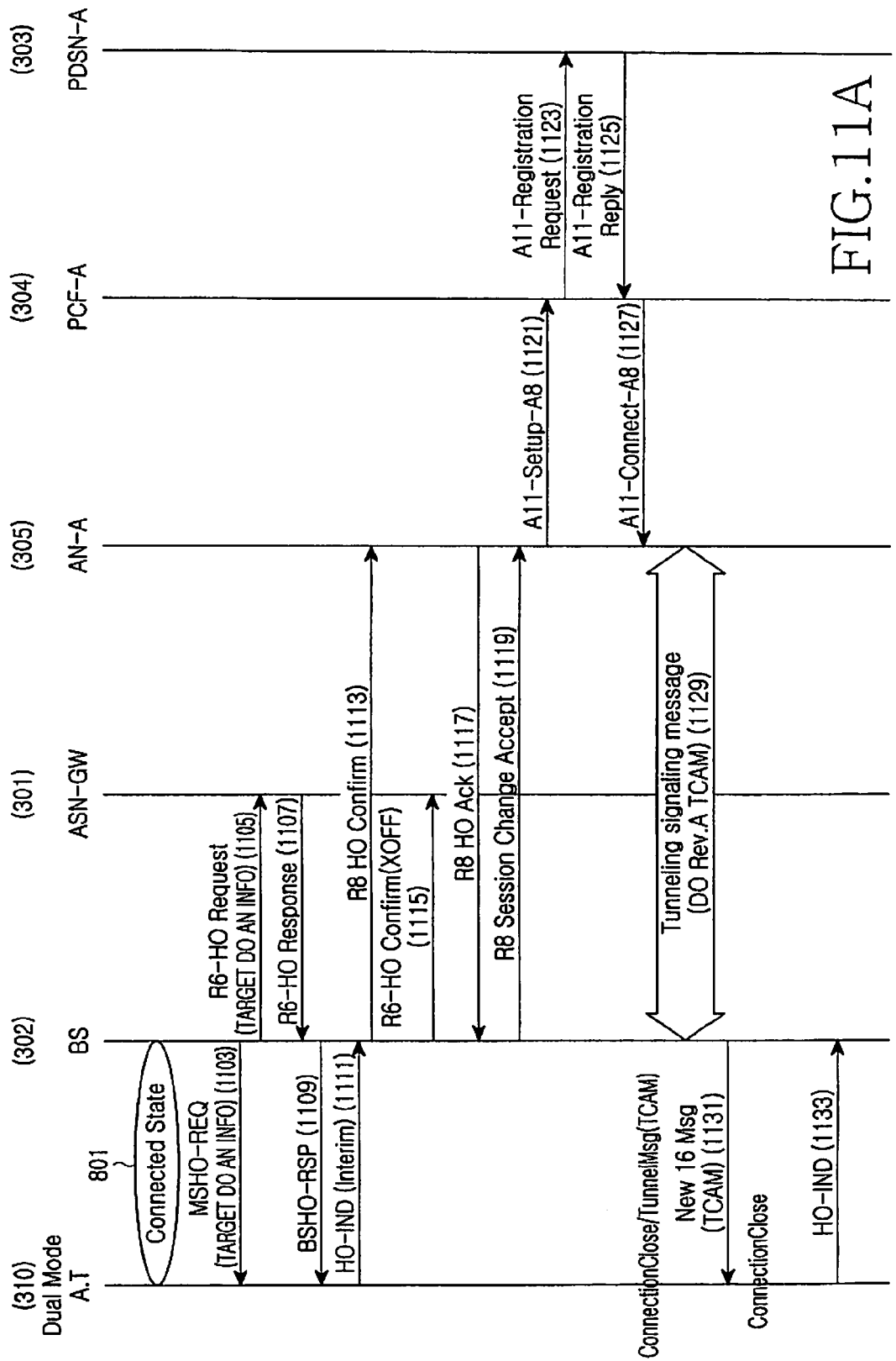
FIGS. 11A to 11C are diagrams illustrating a handoff procedure based on a WiMax network interface according to an embodiment of the present invention.
Figure 11B:
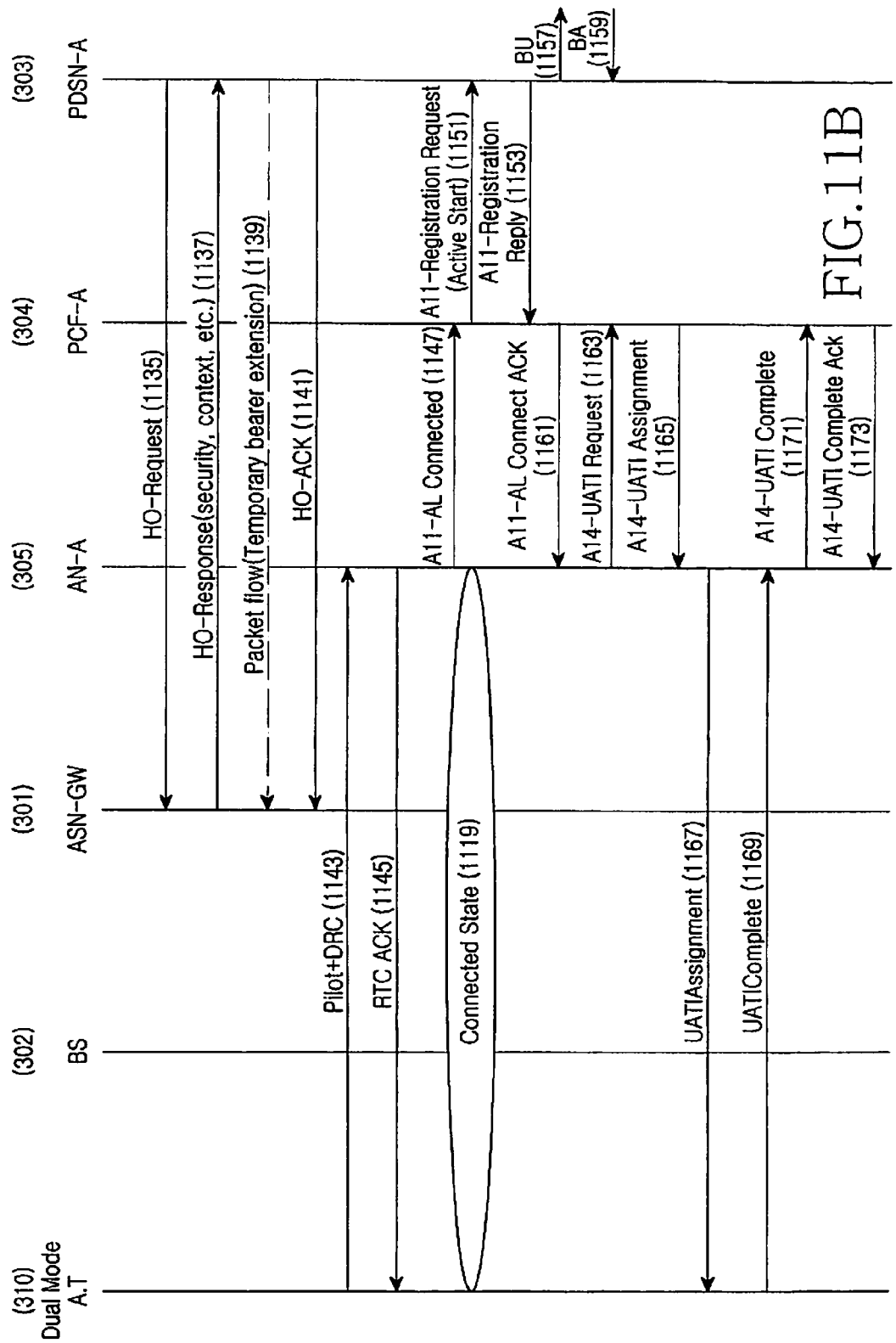
Figure 11C:
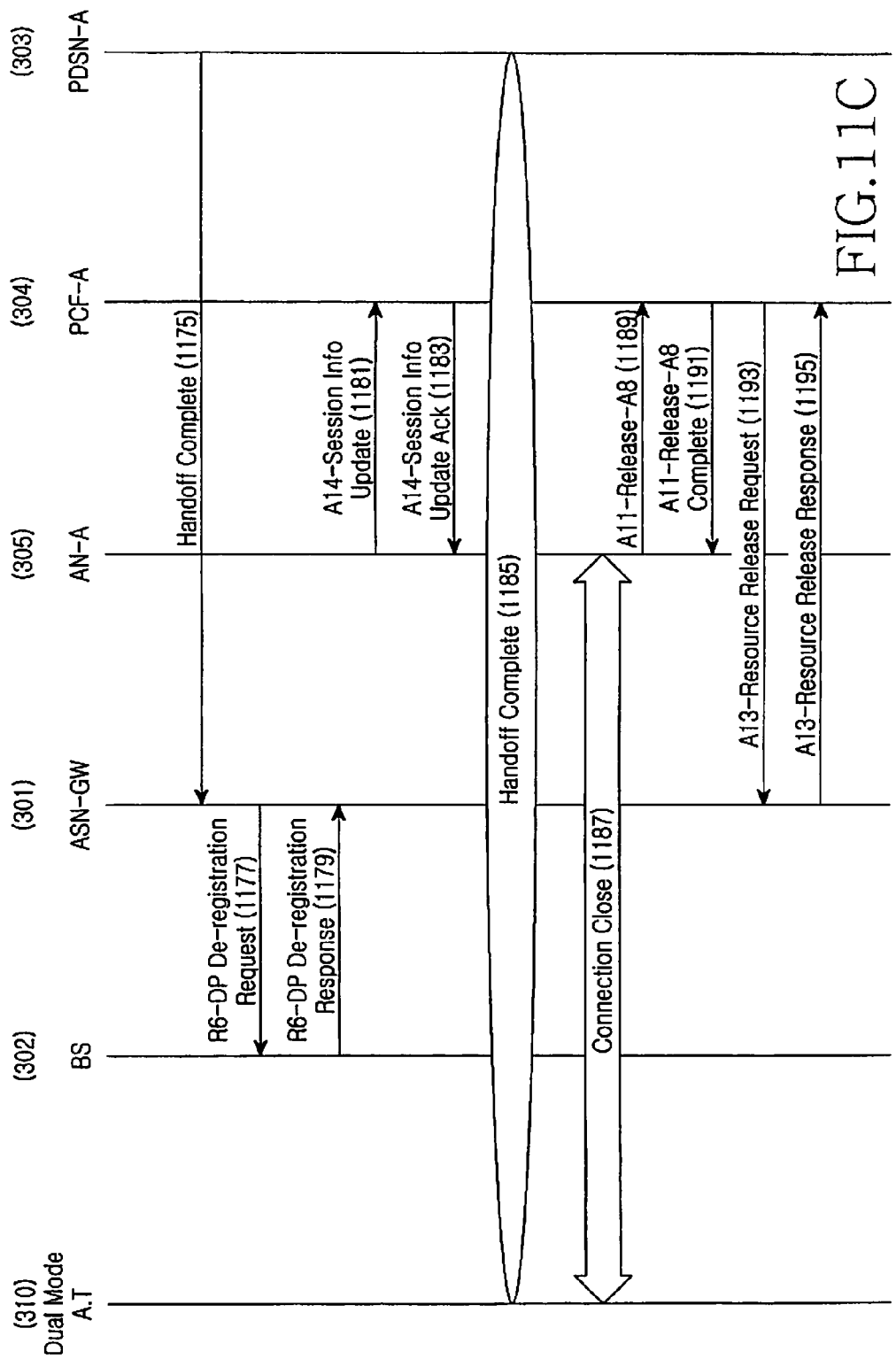

FIGS. 11A to 11C are diagrams illustrating a handoff procedure based on a WiMax network interface according to an embodiment of the present invention.

The embodiment provides a WiMax network-based handoff scheme in which the terminal performs handoff from the WiMax network to the DO network using an R8 interface from the WiMax network to the AN of the DO network.

Steps 1101 to 1111 are equal to steps 1001 to 1011 of FIG. 10A. Thereafter, in steps 1113 to 1133, the BS 302 transfers session information (active set) to the AN 305 using a session change accept (R8-Session Change Accept) message of the WiMax network in step 1119, and the AN 305 feeds back a TCAM to the BS 302 in step 1129, thereby assigning a traffic channel to the terminal 310. Then the terminal 310 sends handoff indication to the BS 302 over the traffic channel. At this moment, in steps 1121 to 1127, a bearer is set up between the AN 305 and the PDSN 303, and a description thereof has been made in FIGS. 4A and 4B and FIGS. 10A to 10C.

A process of step 1135 and its succeeding steps is equal to the process of step 1037 and its succeeding steps of FIGS. 10B and 10C.

As is apparent from the foregoing description, according to the embodiments of the present invention, the terminal can perform seamless handoff from the WiMax network to the DO network, thereby preventing drop of the data service. In addition, the embodiments of the present invention previously transfer the information necessary for handoff to the target network, thereby contributing to a reduction in the handoff time. Further, the embodiments of the present invention can use the WiMax network-based message or the DO network-based message in performing handoff from the WiMax network to the DO network, thereby guaranteeing system compatibility.

While the invention has been shown and described with reference to a certain preferred embodiments thereof, it will be understood by those skilled in the art that various changes in form and details may be made therein without departing from the spirit and scope of the invention as defined by the appended claims.

What is claimed is:

1. A handoff method between a source network to which a terminal is connected in order of a Base Station (BS) and an Access Service Network (ASN), and a target network to which the terminal is connected in order of a Packet Data Service Node (PDSN), a Packet Control Function (PCF) and an Access Network (AN), the method comprising the steps of:
    sending, by the terminal, a handoff request message with AN information of the target network to the ASN via the BS;
    forwarding, by the ASN, the handoff request message to the PCF via the PDSN using the AN information;
    sending, by the PCF, a request for session information to the ASN via the PDSN, upon receipt of the handoff request message;
    sending, by the PDSN, a request for context information to the ASN; and
    transferring, by the ASN, the context information to the PDSN and transferring the session information to the AN via the PDSN and the PCF, upon receipt of the session information request and the context information request.

2. The handoff method of claim 1, wherein the sending a handoff request message further comprises:
    negotiating, by the terminal, with the ASN on a session for access to the target network.

3. The handoff method of claim 1, wherein the session information comprises a predetermined default value.

4. The handoff method of claim 1, wherein the source network comprises a Worldwide Interoperability for Microwave Access (WiMax) network, and the target network comprises a Code Division Multiple Access 1x Evolution Data Only (CDMA 1x-EvDO) network.

5. A handoff system between a source network to which a terminal is connected in order of a Base Station (BS) and an Access Service Network (ASN), and a target network to which the terminal is connected in order of a Packet Data Service Node (PDSN), a Packet Control Function (PCF) and an Access Network (AN), the system comprising:
    the terminal for sending a handoff request message with AN information of the target network to the ASN via the BS, and negotiating with the ASN on a session for access to the target network;
    the BS for forwarding the handoff request message to the PCF via the PDSN using the AN information;
    the PCF for sending a request for session information to the ASN via the PDSN, upon receipt of the handoff request message;
    the PDSN for sending a request for context information to the ASN; and
    the ASN for transferring the context information to the PDSN and transferring the session information to the AN via the PDSN and the PCF, upon receipt of the session information request and the context information request.

6. The handoff system of claim 5, wherein the terminal is designed to negotiate with the ASN on a session for access to the target network.

7. The handoff system of claim 5, wherein the session information comprises a predetermined default value.

8. The handoff system of claim 5, wherein the source network comprises a Worldwide Interoperability for Microwave Access (WiMax) network, and the target network comprises a Code Division Multiple Access 1x Evolution Data Only (CDMA 1x-EvDO) network.

9. A handoff method between a source network to which a terminal is connected in order of a Base Station (BS) and an Access Service Network (ASN), and a target network to which the terminal is connected in order of a Packet Data Service Node (PDSN), a Packet Control Function (PCF) and an Access Network (AN), the BS being directly connected to the AN, the method comprising the steps of:
    sending, by the terminal, a handoff request to the ASN via the BS, and sending a handoff interim indication message to the BS upon receipt of a handoff response in response to the handoff request;
    transferring, by the BS, session information to the AN, upon receipt of the handoff interim indication message;
    setting up, by the AN, a bearer to the PDSN via the PCF using the session information, upon receipt of the session information; and
    receiving context information from the ASN, when the PDSN to which the bearer is set up sends a handoff request to the ASN.

10. The handoff method of claim 9, wherein the sending a handoff request further comprises:
    negotiating, by the terminal, with the ASN on a session for access to the target network.

11. The handoff method of claim 9, wherein the session information comprises a predetermined default value.

12. The handoff method of claim 9, wherein the source network comprises a Worldwide Interoperability for Microwave Access (WiMax) network, and the target network comprises a Code Division Multiple Access 1x Evolution Data Only (CDMA 1x-EvDO) network.

13. The handoff method of claim 9, wherein the transferring session information comprises:
    transferring the session information using a message structure of the target network.

14. The handoff method of claim 9, wherein the transferring session information comprises:
    transferring the session information using a message structure of the source network.

15. A handoff system between a source network to which a terminal is connected in order of a Base Station (BS) and an Access Service Network (ASN), and a target network to which the terminal is connected in order of a Packet Data Service Node (PDSN), a Packet Control Function (PCF) and an Access Network (AN), the BS being directly connected to the AN, the system comprising:
    the terminal for sending a handoff request to the ASN via the BS, and sending a handoff interim indication message to the BS upon receipt of a handoff response in response to the handoff request;
    the BS for transferring session information to the AN upon receiving the handoff interim indication message;
    the AN for receiving the session information, and setting up a bearer to the PDSN via the PCF using the session information; and
    the PDSN for sending a handoff request to the ASN and receiving a handoff response with context information from the ASN, when the terminal sends a handoff indication after the bearer is set up.

16. The handoff system of claim 15, wherein the terminal is designed to negotiate with the ASN on a session for access to the target network.

17. The handoff system of claim 15, wherein the session information comprises a predetermined default value.

18. The handoff system of claim 15, wherein the source network comprises a Worldwide Interoperability for Microwave Access (WiMax) network, and the target network comprises a Code Division Multiple Access 1x Evolution Data Only (CDMA 1x-EvDO) network.

19. The handoff system of claim 15, wherein the BS transfers the session information using a message structure of the target network.

20. The handoff system of claim 15, wherein the BS transfers the session information using a message structure of the source network.

* * * * *